(12) United States Patent  
Brengartner et al.

(10) Patent No.: US 12,474,248 B2  
(45) Date of Patent: Nov. 18, 2025

(54) SYMMETRIZING A VIBRONIC SENSOR

(71) Applicant: Endress+Hauser SE+Co. KG, Maulburg (DE)

(72) Inventors: Tobias Brengartner, Emmendingen (DE); Gerd Bechtel, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 492 days.

(21) Appl. No.: 18/002,355

(22) PCT Filed: Jun. 16, 2021

(86) PCT No.: PCT/EP2021/066265  
§ 371 (c)(1),  
(2) Date: Dec. 19, 2022

(87) PCT Pub. No.: WO2021/255105  
PCT Pub. Date: Dec. 23, 2021

(65) Prior Publication Data  
US 2023/0236102 A1 Jul. 27, 2023

(30) Foreign Application Priority Data  
Jun. 19, 2020 (DE) .................. 10 2020 116 299.5

(51) Int. Cl.  
*G01N 9/32* (2006.01)  
*G01F 23/296* (2022.01)  
*G01N 9/00* (2006.01)

(52) U.S. Cl.  
CPC ............ *G01N 9/32* (2013.01); *G01F 23/296* (2013.01); *G01N 2009/006* (2013.01)

(58) Field of Classification Search  
CPC .... G01N 9/32; G01N 2009/006; G01N 9/002; G01N 11/16; G01F 23/296  
See application file for complete search history.

(56) References Cited

U.S. PATENT DOCUMENTS

2005/0209769 A1* 9/2005 Yamashita ............. G08G 1/164  
                                                              340/907  
2007/0277608 A1* 12/2007 Lopatin ............... G01F 23/2966  
                                                             73/584

(Continued)

FOREIGN PATENT DOCUMENTS

| CH | 543195 A | 11/1973 |
|---|---|---|
| CN | 1930455 A | 3/2007 |

(Continued)

*Primary Examiner* — Tarun Sinha  
(74) *Attorney, Agent, or Firm* — Mark A. Logan; Endress+Hauser (USA) Holding, Inc.

(57) ABSTRACT

A device for determining and/or monitoring a process variable of a medium comprises a sensor unit with a mechanically vibrating fork having a first and a second vibrating element and having a first piezoelectric element arranged in the first vibrating element. An electronic unit of the device is designed to excite mechanical vibrations in the mechanically vibratable unit, receive the mechanical vibrations of the vibratable unit and convert same into a first reception signal, generate the excitation signal on the basis of the first reception signal such that there is a specifiable phase shift between the excitation signal and the first reception signal, and ascertain the process variable using the first reception signal. The electronic unit has an adjustable impedance element connected in series to the first piezoelectric element.

7 Claims, 4 Drawing Sheets

(56) References Cited

U.S. PATENT DOCUMENTS

2010/0244989 A1*  9/2010  Furuhata ................ H03H 9/215
                                                      333/197
2019/0226900 A1*  7/2019  Brengartner ........... G01N 9/002

FOREIGN PATENT DOCUMENTS

| | | |
|---|---|---|
| CN | 104081171 A | 10/2014 |
| CN | 107407586 A | 11/2017 |
| DE | 102004011377 A1 | 9/2005 |
| DE | 102004018506 A1 | 11/2005 |
| DE | 102009026685 A1 | 12/2010 |
| DE | 102011090014 A1 | 7/2013 |
| DE | 102012100728 A1 | 8/2013 |
| DE | 102016112743 A1 | 1/2018 |
| DE | 102017130527 A1 | 6/2019 |
| DE | 102018127526 A1 | 5/2020 |
| WO | 2011085872 A2 | 7/2011 |

* cited by examiner

SYMMETRIZING A VIBRONIC SENSOR

CROSS-REFERENCE TO RELATED APPLICATIONS

The present application is related to and claims the priority benefit of DPMA Patent Application No. 10 2020 116 299.5, filed on Jun. 19, 2020, and International Patent Application No. PCT/EP2021/066265, filed on Jun. 16, 2021, the entire contents of which are incorporated herein by reference.

TECHNICAL FIELD

The present invention relates to a device for determining and/or monitoring at least one process variable of a medium, comprising a sensor unit with a mechanically vibratable unit in the form of a vibrating fork and an electronic unit. The present invention further relates to a method for symmetrizing a first and a second vibrating element of a sensor unit in the form of a vibrating fork, which sensor unit is part of a vibronic sensor. The medium is located in a container, e.g., in a reservoir or in a pipeline.

BACKGROUND

Vibronic sensors are often used in process and/or automation engineering. In the case of fill level measuring devices, they have at least one mechanically vibratable unit such as, for example, a vibrating fork, a single rod, or a diaphragm. In operation, this is excited to produce mechanical vibrations by means of a drive/receiving unit, often in the form of an electromechanical transducer unit, which in turn can be a piezoelectric drive or an electromagnetic drive, for example. A wide variety of corresponding field devices are produced by the applicant and are distributed under the name LIQUIPHANT or SOLIPHANT, for example. The underlying measurement principles are known in principle from numerous publications. The drive/receiving unit excites the mechanically vibratable unit to induce mechanical vibrations by means of an electrical excitation signal. Conversely, the drive/receiving unit can receive the mechanical vibrations of the mechanically vibratable unit and convert same into an electrical reception signal. The drive/receiving unit is accordingly either a separate drive unit and a separate receiving unit, or a combined drive/receiving unit.

In many instances, the drive/receiving unit is thereby part of an electrical resonant feedback circuit by means of which the excitation of the mechanically vibratable unit to produce mechanical vibrations takes place. For example, the resonant circuit condition according to which the amplification factor is and all phases occurring in the resonant circuit result in a multiple of 360° must be fulfilled for a resonant vibration. To excite and fulfill the resonant circuit condition, a defined phase shift must be ensured between the excitation signal and the reception signal. A predeterminable value for the phase shift, thus a setpoint for the phase shift between the excitation signal and the reception signal, is therefore often set. For this purpose, various solutions, both analog and digital methods, have become known from the prior art, as described, for example, in documents DE102006034105A1, DE102007013557A1, DE102005015547A1, DE102009026685A1, DE102009028022A1, DE102010030982A1, or DE00102010030982A1.

Both the excitation signal and the reception signal are characterized by their frequency $\omega$, amplitude A, and/or phase $\phi$. Accordingly, changes in these variables are usually used to determine the respective process variable. The process variable can, for example, be a fill level, a specified fill level, or the density or the viscosity of the medium, and also the flow rate. Given a vibronic level switch for liquids, for example, a distinction is made between whether the vibratable unit is covered by the liquid or vibrates freely. These two conditions, the free condition and the covered condition, are differentiated, for example, on the basis of different resonant frequencies, i.e. on the basis of a frequency shift.

The density and/or viscosity can in turn only be determined with such a measuring device if the vibratable unit is completely covered by the medium. In connection with the determination of the density and/or viscosity, different possibilities have likewise become known from the prior art, such as those disclosed in documents DE10050299A1, DE102007043811A1, DE10057974A1, DE102006033819A1, DE102015102834A1, or DE102016112743A1.

With a vibronic sensor, a plurality of process variables can be measured accordingly and be used for characterizing the respective process. In many cases, however, further information about the process, especially, knowledge of further physical and/or chemical process variables and/or process parameters, is required for comprehensive process monitoring and/or control. This can be achieved, for example, by integrating further field devices into the respective process. The measured values provided by the various measuring devices can then be further processed in a suitable manner in a unit superordinate to the devices.

In order to achieve high measurement accuracy for vibronic sensors in the form of vibrating forks, it is of great importance that the two vibrating elements are designed identically. Even very small deviations in the geometries of the two vibrating elements from one another lead to a changed vibration behavior, which has a direct influence on the process variable to be determined in each case or can even prevent a determination of the respective process variable. Typically, mechanical vibrations in the vibrating elements of a vibrating fork are individually excited during the manufacturing process, while the respective other vibrating element is blocked. Subsequently, the vibration behavior of both vibrating elements is compared and, in the event of a deviation, the vibrating elements are machined individually, for example by material being removed at suitable positions. This is a comparatively complex and possibly iterative and therefore time-consuming process.

SUMMARY

Therefore, the object of the present invention is to specify an option by means of which a high measurement accuracy of sensors comprising vibrating forks can be ensured in a simple manner.

With regard to the device, the object on which the invention is based is achieved by a device for determining and/or monitoring at least one process variable of a medium, comprising a sensor unit with a mechanically vibratable unit in the form of a vibrating fork with a first and a second vibrating element, and with at least one first piezoelectric element which is at least partly arranged in the first vibrating element, and an electronic unit, which is designed to excite mechanical vibrations in the mechanically vibratable unit by means of an excitation signal, receive the mechanical vibrations of the vibratable unit and convert same into a first reception signal, generate the excitation signal on the basis of the first reception signal such that a specifiable phase shift is provided between the excitation signal and the first reception signal, and ascertain the process variable using the first reception signal. According to the invention, the electronic unit has at least one adjustable impedance element, which is connected in series to the first piezoelectric element.

A specifiable value for an impedance of at least the first piezoelectric element can be set by means of the adjustable impedance element. The rigidity of piezoelectric elements depends in principle on how well electrical charges can flow within the piezoelectric element and, as a result, on the impedance of a subsequent electronic stage. The worse electrical charges can flow, the greater the rigidity. By means of the adjustable impedance, the rigidity of the first piezoelectric element and thus the vibration behavior of the respective vibrating element can thus be influenced in a targeted manner. An adaptation of the vibration behavior of the two vibrating elements, i.e., a symmetrizing of the two vibrating elements, therefore advantageously takes place by adjusting the impedance. No mechanical changes must be made to the vibrating elements themselves. This procedure thus makes it possible to symmetrize a vibrating fork with high precision and with little effort, and thus to significantly improve the measurement accuracy of the respective sensor.

Within the scope of the present invention, the at least one piezoelectric element can, on the one hand, continue to perform the task of an electromechanical transducer unit and serve to generate and detect vibrations. However, it can also be an additional element which serves only for symmetrizing. In this case, the device also comprises an electromechanical transducer unit, which can be a piezoelectric or electrodynamic drive, for example.

One embodiment provides that the device comprises at least two piezoelectric elements, wherein a second piezoelectric element is at least partly arranged in the second vibrating element. An embodiment with two piezoelectric elements in the two vibrating rods, especially two identically designed piezoelectric elements in the two vibrating rods, leads to a high degree of symmetry, since both vibrating elements are designed identically.

In this regard, it is also advantageous if the electronic unit has two adjustable impedance elements, wherein a second impedance element is connected in series to the second piezoelectric element.

In a further embodiment of the device, the at least one impedance element is an adjustable resistor, especially a potentiometer, or a switched-capacitor filter.

One embodiment of the device provides that the electronic unit is designed to adjust an impedance of the at least one impedance element, especially as a function of a frequency, quality and/or amplitude of the reception signal.

In a further embodiment, the device, especially the electronic unit, is designed to emit a transmission signal and to receive a second reception signal, and to determine the at least one process variable using the first and/or second reception signal. In this context, reference is made to the as yet unpublished international patent application with reference number PCT/EP 2019/064724, to which full reference is made within the scope of the present application.

In a further embodiment, the device comprises a unit for determining and/or monitoring the temperature, which unit especially comprises a temperature sensor in the form of a resistor element or a thermocouple. Some possible embodiments for a device designed in this way are described, for example, in the as yet unpublished German patent application with reference number 102019116150.9, to which application full reference is made.

Finally, a further embodiment provides that the device comprises a unit for determining and/or monitoring a pressure of the medium and/or a unit for determining and/or monitoring a conductivity and/or capacity of the medium. Some possible embodiments for devices designed in this way are described, for example, in the as yet unpublished German patent applications with reference numbers 102019116151.7 and 102019116152.5, to which applications reference is also made in full.

The object on which the invention is based is further achieved by a method for symmetrizing a first and a second vibrating element of a vibrating fork, which is part of a sensor unit of the device for determining and/or monitoring a process variable of a medium, wherein at least one first piezoelectric element is at least partly arranged in the first vibrating element, and wherein an electronic unit of the device comprises at least one first adjustable impedance element which is connected in series to the first piezoelectric element, and wherein the method comprises the following method steps, Exciting mechanical vibrations in the first vibrating element by means of a symmetrizing excitation signal and receiving a first symmetrizing reception signal, Exciting mechanical vibrations in the second vibrating element by means of the symmetrizing excitation signal and receiving a second symmetrizing reception signal, Comparing the first and second symmetrizing reception signals, especially on the basis of a first or second frequency, amplitude and/or quality ascertained from the first and/or second symmetrizing reception signal, and Adjusting the at least one impedance element based on the comparison.

The symmetrizing excitation signal is especially a periodic and/or harmonic, especially electrical, signal. For example, a resonant vibration can be excited for each of the two vibrating elements. Preferably, the same symmetrizing excitation signal is used for the two vibrating elements.

The method according to the invention is usable especially in connection with a device according to the invention according to at least one of the described embodiments and in this case serves to symmetrize a device according to the invention by setting a suitable value for the impedance, or by setting a suitable value of the impedance element.

It is advantageous if the at least one impedance element is adjusted such that the first and second frequency, amplitude and/or quality each have the same value.

A further embodiment of the method provides that one vibrating element is mechanically blocked, while vibrations are excited in the other vibrating element. In this case, symmetrizing takes place outside an application of the respective sensor in a process. Symmetrizing can preferably take place as part of the manufacturing process of the sensor and/or before commissioning the sensor in the intended process, for example at the operating location of the sensor. Alternatively, however, it is also conceivable to supply a symmetrizing excitation signal to the sensor during continuous operation.

In one embodiment of the method, for which the sensor unit comprises at least two piezoelectric elements, wherein a second piezoelectric element is at least partly arranged in the second vibrating element, and wherein an electronic unit of the device has a second impedance element which is connected in series to the second piezoelectric element, the first and second impedance element are adjusted based on the comparison.

A further embodiment of the method provides that the at least one impedance element is adjusted such that an amplitude of the first and/or second symmetrizing reception signal, or of a signal composed of the first and second symmetrizing reception signals, is at maximum. Such a procedure is particularly advantageous when symmetrizing is to be carried out during continuous operation of the device. If, for example, a vibrating element is then not mechanically blocked, it is also advantageous to determine a total signal composed of the first and second symmetrizing reception signals and to maximize the amplitude thereof. By maximizing the amplitude, it is possible especially to compensate for effects by sediment and/or corrosion in the region of the sensor unit. Both sediment and corrosion can result in a symmetry of the two vibrating elements being lost over time when both vibrating elements are not uniformly affected by these effects.

A further embodiment provides that the presence of corrosion and/or sediment in the region of at least one of the vibrating elements is inferred based on a change in the amplitude of the first and/or second symmetrizing reception signal over time. Accordingly, the detection of a change in the amplitude over time can also be used to infer the presence of sediment and/or corrosion.

In this regard, it is also advantageous if, in the case of corrosion and/or sediment, at least one impedance element is adjusted such that an influence of the corrosion or the sediment on the first and/or second symmetrizing reception signal is reduced or compensated.

It should be pointed out that the embodiment described in connection with the device according to the invention can also be applied mutatis mutandis to the method according to the invention, and vice versa.

BRIEF DESCRIPTION OF THE DRAWINGS

The invention is explained in greater detail with reference to the following figures. The following is shown.

DETAILED DESCRIPTION

In the figures, identical elements are respectively provided with the same reference signs.

Figure 1:
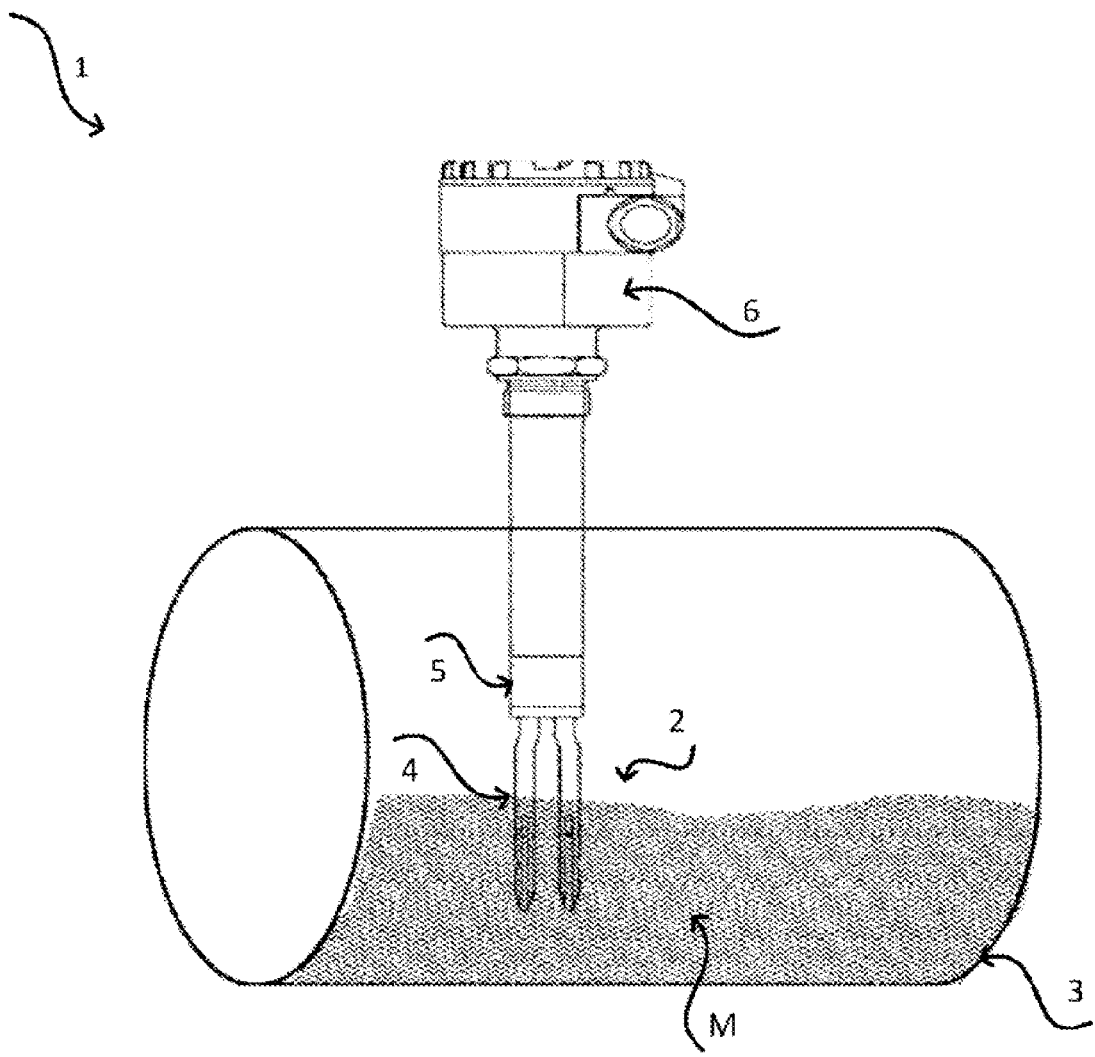
FIG. 1 shows a schematic drawing of a vibronic sensor according to the prior art.

FIG. 1 shows a vibronic sensor 1 having a sensor unit 2. The sensor has a mechanically vibratable unit 4, in the form of a vibrating fork, which is partially dipped into a medium M which is located in a reservoir 3. The vibrating unit 4 is excited by the excitation/receiving unit 5 to mechanical vibrations and can, for example, be excited by means of a piezoelectric stack drive or bimorphic drive. Other vibronic sensors have electromagnetic drive/receiving units 5, for example. It is possible to use a single drive/receiving unit 5 which serves both to excite the mechanical vibrations and to detect them. However, it is likewise conceivable to realize one each, a drive unit and a receiving unit. Furthermore depicted in FIG. 1 is an electronics unit 6 by means of which the signal acquisition, evaluation, and/or feed takes place.

FIG. 2 shows, by way of example, various sensor units 2, which are suitable for carrying out a method according to the invention. The mechanically vibratable unit 4 shown in FIG. 2a comprises two vibrating elements 9a, 9b, which are mounted on a base 8 and which are therefore also referred to as fork teeth. Optionally, a paddle may respectively also be formed on the end sides of the two vibrating elements 9a, 9b [not shown here]. In each of the two vibrating elements 9a, 9b, a cavity 10a, 10b, especially, a pocket-like cavity, is respectively introduced, in which at least one piezoelectric element 11a, 11b of the drive/receiving unit 5 is respectively arranged. Preferably, the piezoelectric elements 11a and 11b are embedded in the cavities 10a and 10b. The cavities 10a, 10b can be such that the two piezoelectric elements 11a, 11b are located completely or partly in the region of the two vibrating elements 9a, 9b. Such an arrangement along with similar arrangements are extensively described in DE102012100728A1.

Figure 2A:
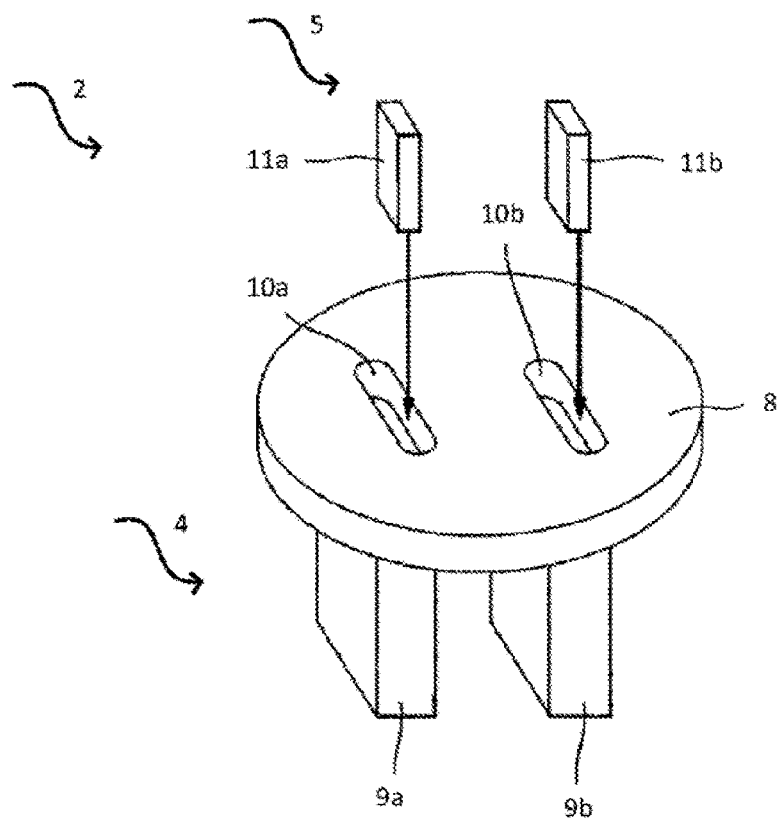
FIG. 2 shows a plurality of possible embodiments of a sensor unit that are known per se from the prior art and are suitable for carrying out the method according to the present disclosure.
Figure 2B:
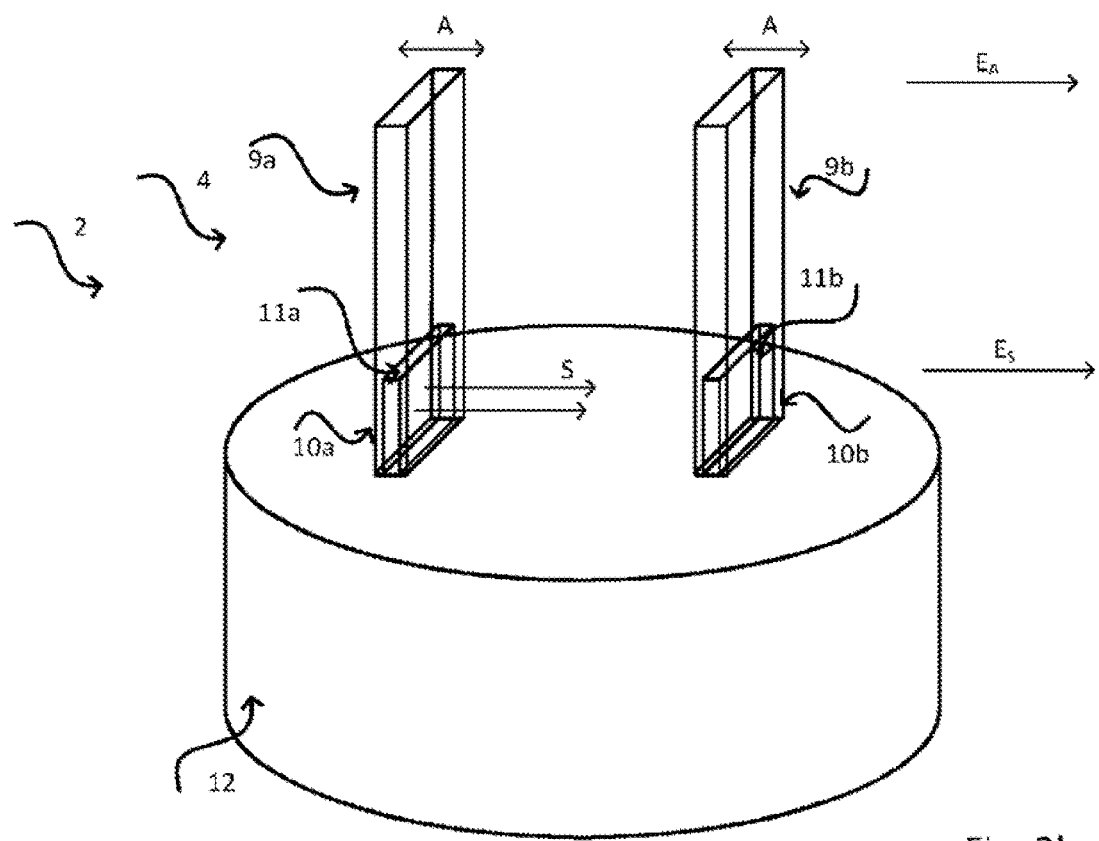

Another possible exemplary embodiment of a sensor unit 2 is depicted in FIG. 2b. The mechanically vibratable unit 4 has two vibrating elements 9a, 9b, which are aligned in parallel to one another and are configured here in a rod-shaped manner. They are mounted on a disk-shaped element 12 and can be excited separately from one another to vibrate mechanically. Their vibrations can likewise be received and evaluated separately from one another. The two vibrating elements 9a and 9b respectively have a cavity 10a and 10b, in which at least one piezoelectric element 11a and 11b is respectively arranged in the region facing the disk-shaped element 12. With respect to the embodiment according to FIG. 2b, reference is again made to the as yet unpublished German patent application with reference number DE102017130527A1.

As shown schematically in FIG. 2b, according to the invention, the sensor unit 2 is supplied on the one hand with an excitation signal A such that mechanical vibrations are excited in the vibratable unit 4. The vibrations are generated by means of the two piezoelectric elements 11a and 11b. It is conceivable both for both piezoelectric elements to be supplied with the same excitation signal A and for the first vibrating element 11a to be supplied with a first excitation signal $A_1$ and the second vibrating element 11b to be supplied with a second excitation signal $A_2$. It is also conceivable for a first reception signal $E_A$ to be received on the basis of the mechanical vibrations, or for each vibrating element 9a, 9b to receive a separate reception signal $E_{A1}$ or $E_{A2}$.

In addition, a transmission signal S is emitted from the first piezoelectric element 11a and is received in the form of a second reception signal $E_S$ by the second piezoelectric element 11b. Since the two piezoelectric elements 11a and 11b are arranged at least in the region of the vibrating elements 9a and 9b, the transmission signal S passes through the medium M, provided that the sensor unit 2 is in contact with the medium M and is influenced accordingly by the properties of the medium M. The transmission signal S is preferably an ultrasonic signal, especially a pulsed ultrasonic signal, especially at least one ultrasonic pulse. However, it is also conceivable for the transmission signal S to be emitted by the first piezoelectric element 11a in the region of the first vibrating element 9a and to be reflected at the second vibrating element 9b. In this case, the second reception signal $E_S$ is received by the first piezoelectric element 11a. In this case, the transmission signal S passes through the medium M twice, which leads to a doubling of a transit time r of the transmission signal S.

In addition to these two embodiments shown of an device 1 according to the invention, numerous other variants are also conceivable, which likewise fall within the present invention. For example, for the embodiments according to figures FIG. 2a and FIG. 2b, it is possible to use only one piezoelectric element 11a, 11b and to arrange it at least in one of the two vibrating elements 9a, 9b. In this case, the piezoelectric element 9a serves to generate the excitation signal and the transmission signal S, and to receive the first $E_1$ and the second reception signal $E_2$. In this case, the transmission signal is reflected at the second vibrating element 9b without piezoelectric element 11b.

Figure 2C:
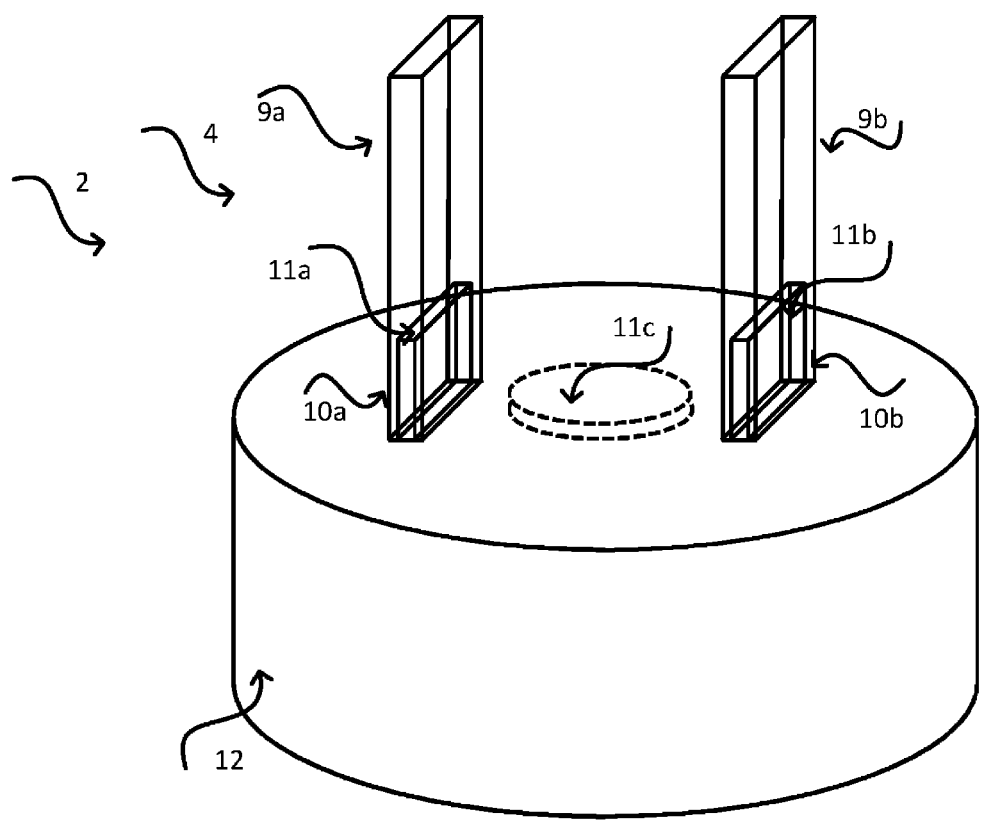

Another exemplary possibility is depicted in FIG. 2c. Here, a third piezoelectric element 11c is provided in the region of the membrane 12. The third piezoelectric element 11c serves to generate the excitation signal A and to receive the first reception signal $E_1$; the first 11a and the second piezoelectric element 11b serve to generate the transmission signal S or to receive the second reception signal $E_2$. Alternatively, it is possible, for example, to generate the excitation signal A and the transmission signal S and receive the second reception signal $E_2$ with the first 11a and/or the second piezoelectric element 11b, wherein the third piezoelectric element 11c serves to receive the first reception signal $E_1$. It is also possible to generate the transmission signal S with the first 11a and/or the second piezoelectric element 11b and the excitation signal A with the third piezoelectric element 11c and to receive the first $E_1$ and/or the second reception signal $E_2$ with the first 11a and/or the second piezoelectric element 11b. In the case of FIG. 2c, it is also possible for other embodiments to dispense with the first 11a or the second piezoelectric element 11b.

Figure 2D:
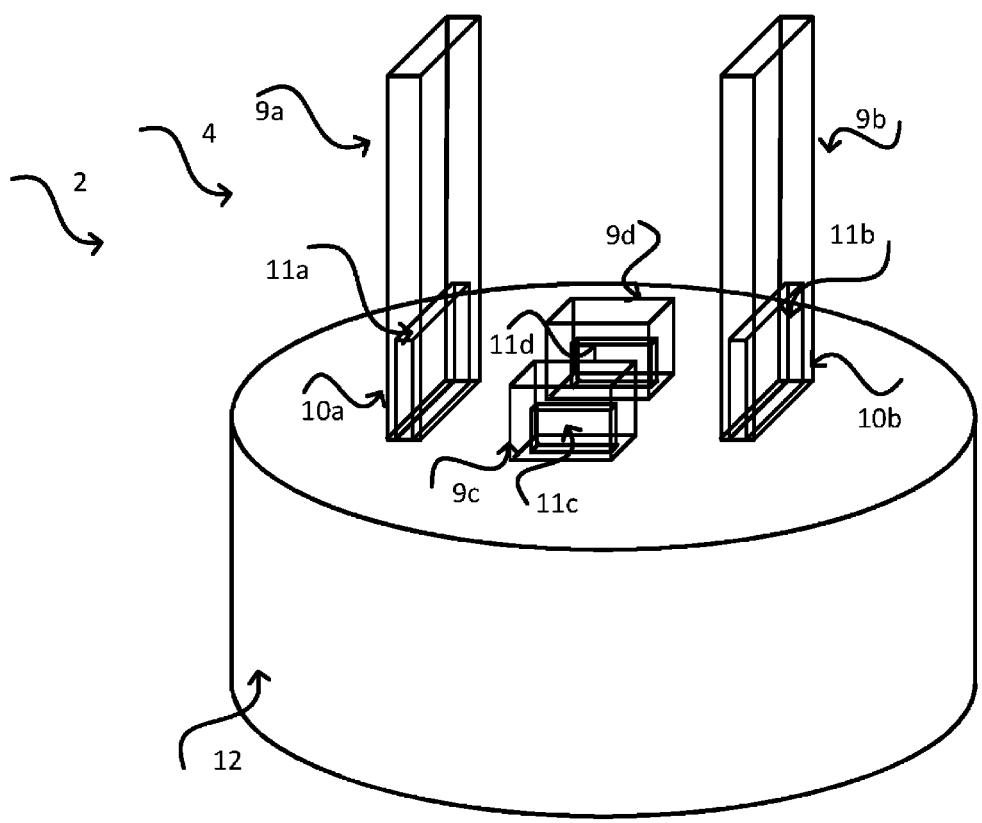

Yet another possible embodiment of the device 1 is the subject matter of FIG. 2d. Starting from the embodiment of FIG. 2b, the device comprises a third 9c and a fourth vibrating element 9d. However, the latter do not serve to generate vibrations. Rather, a third 11c and a fourth piezoelectric element 11d are respectively arranged in the additional elements 9c, 9d. In this case, the vibronic measurement is carried out by means of the first two piezoelectric elements 11a, 11b and the ultrasonic measurement by means of the other two piezoelectric elements 11c, 11d. Here as well, a piezoelectric element, e.g., 11b and 11d, can be dispensed with depending on the measurement principle. For reasons of symmetry, however, it is advantageous to always use two additional vibrating elements 9c, 9d.

In the embodiments shown, the piezoelectric elements 11 each also serve for vibration excitation and detection and thus have a dual function. In other embodiments, at least one piezoelectric element 11 arranged in at least one of the vibrating elements 9 can also serve exclusively for symmetrizing the vibrating fork, while the electromechanical transducer unit 5 is a separate component. The at least one piezoelectric element 11, which is at least partly arranged in one of the vibrating elements 9, is preferably arranged in a region which decisively influences the rigidity of the respective vibrating element, for example in the root region, i.e., in an end region, which is attached to the membrane 8 or the disk-shaped element 12, of the vibrating element 9.

Figure 3:
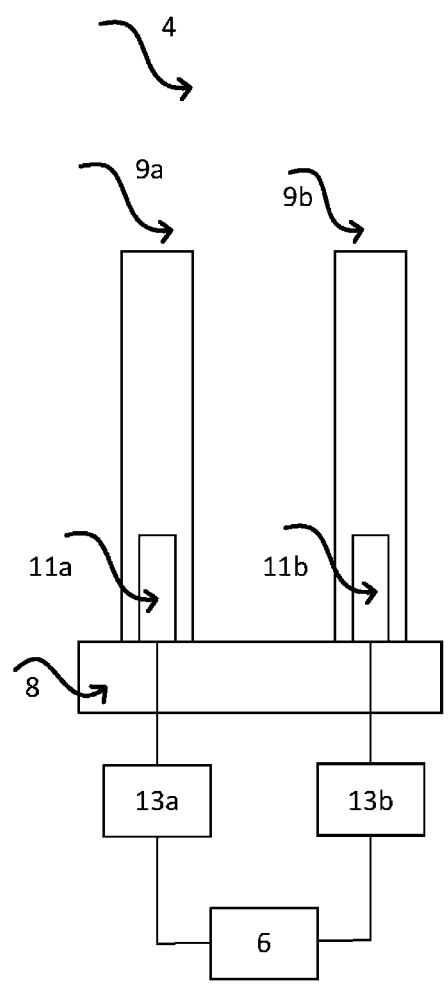
FIG. 3 shows an exemplary embodiment of a device according to the present disclosure with two adjustable impedance elements.

An exemplary embodiment of a device 1 according to the invention in which the mechanically vibratable unit 4 is configured similarly to that of FIG. 2a is shown in FIG. 3. In addition to various components combined with the reference symbol 6 in the box, the electronic unit 6 comprises two electrically adjustable impedance elements 13a, 13b, each of which is connected in series to the two piezoelectric elements 11a, 11b. In other embodiments, only one impedance element 13 can also be provided, which is connected in series to one of the piezoelectric elements 11.

The rigidity of the vibrating elements 9a, 9b can be directly influenced by means of the impedance elements 13a, 13b. As a result, an identical vibration behavior of the two vibrating rods 9a, 9b, i.e., a symmetry between both vibrating elements 9a, 9b, can in turn be achieved. The impedance/impedances can be adjusted in a suitable manner as part of the manufacturing process, before commissioning at the place of use or during continuous operation.

The invention claimed is:

1. A method for symmetrizing a first and a second vibrating element of a vibrating fork, which is part of a sensor unit of a device for determining and/or monitoring at least one process variable of a medium, wherein a first piezoelectric element is at least partly arranged in the first vibrating element, and wherein an electronic unit of the device includes a first adjustable impedance element connected in series to the first piezoelectric element, and wherein the method comprising:
   exciting mechanical vibrations in the first vibrating element via a symmetrizing excitation signal and receiving a first symmetrizing reception signal;
   exciting mechanical vibrations in the second vibrating element via the symmetrizing excitation signal and receiving a second symmetrizing reception signal;
   comparing the first and second symmetrizing reception signals on the basis of a first or second frequency, an amplitude and/or a quality ascertained from the first and/or second symmetrizing reception signals; and
   adjusting the at least one impedance element based on the comparison.

2. The method according to claim 1, further comprising: adjusting the at least one impedance element such that the first and second frequency, the amplitude and/or the quality each have the same value.

3. The method according to claim 2, further comprising: mechanically blocking one vibrating element while vibrations are excited in the other vibrating element.

4. The method according to claim 1, wherein the sensor unit includes a second piezoelectric element and the second piezoelectric element is at least partly arranged in the second vibrating element, wherein the electronic unit of the device further includes a second impedance element and the second impedance element is connected in series to the second piezoelectric element, and wherein the first and second impedance element are adjusted based on the comparison.

5. The method according to claim 4, wherein the at least one impedance element is adjusted such that the amplitude of the first and/or second symmetrizing reception signal is at a maximum.

6. The method according to claim 5, wherein a presence of corrosion and/or sediment in a region of at least one of the vibrating elements is inferred based on a change in the amplitude of the first and/or second symmetrizing reception signal over time.

7. The method according to claim 6, wherein in the case of the presence of corrosion and/or sediment, at least one impedance element is adjusted such that an influence of the corrosion or the sediment on the first and/or second symmetrizing reception signal is reduced or compensated.

* * * * *